Dec. 19, 1950

A. C. BARROWS 2,534,751

ELECTRICAL CONTROL MEANS FOR
BALING PRESSES AND THE LIKE

Filed Jan. 19, 1948

INVENTOR.
ALFORD C. BARROWS

BY
Whittemore Hulbert & Belknap

ATTORNEYS

Dec. 19, 1950  A. C. BARROWS  2,534,751
ELECTRICAL CONTROL MEANS FOR
BALING PRESSES AND THE LIKE

Filed Jan. 19, 1948  2 Sheets-Sheet 2

INVENTOR.
ALFORD C. BARROWS
BY
Whittemore Hulbert & Belknap
ATTORNEYS

Patented Dec. 19, 1950

2,534,751

UNITED STATES PATENT OFFICE 2,534,751

ELECTRICAL CONTROL MEANS FOR BALING PRESSES AND THE LIKE

Alford C. Barrows, Ann Arbor, Mich., assignor to Economy Baler Company, Ann Arbor, Mich., a corporation of Michigan Application January 19, 1948, Serial No. 3,084

5 Claims. (Cl. 318—256)

The invention relates to electric motor driven mechanisms, such as used for the operation of baling presses and the like, in which the load reacting on the motor is progressively increased during the forward movement of the mechanism. With such constructions it is usual to protect the motor, first, by a limit switch which opens the motor circuit after a predetermined travel of the mechanism; and second, by an overload switch which opens the motor circuit when the current volume exceeds a predetermined limit. It is also usual to provide electrical controlling means for the starting of the motor in reverse directions and for stopping it whenever desired. Such controlling means include push button, or other manually operated switches, for control circuits which latter effect the operation of the main switch, or switches, for operating the motor in forward and reverse directions. It has been found that the control circuit which starts the motor in its forward direction may be used to defeat the purpose of the safety switches. Thus supposing that the motor in its forward drive is deenergized by the automatic operation of the overload switch, there is nothing to prevent the operator from again starting the motor which sometimes causes disastrous results. In other words, the operator desiring to increase the pressure beyond safety limit can do so, but may either burn out the motor or damage the mechanism.

It is the object of the instant invention to obtain a construction of controlling means which renders it impossible for the operator to re-start the motor in its forward direction until it has first been operated in the reverse direction. This does not interfere with the normal operation of the baling press for the motor must be reversed after each compression operation to return the compressor platen. The invention, therefore, consists in the means for accomplishing this purpose as hereinafter set forth.

Figure 1:
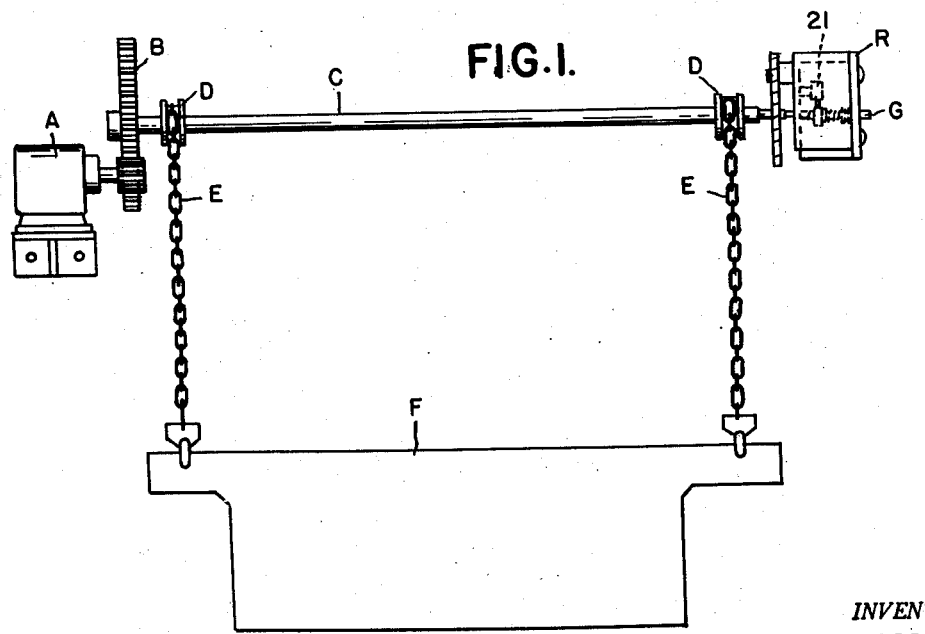
Fig. 1 is an elevation illustrating a portion of the operating mechanism for the compressor platen of a baling press.
Figure 4:
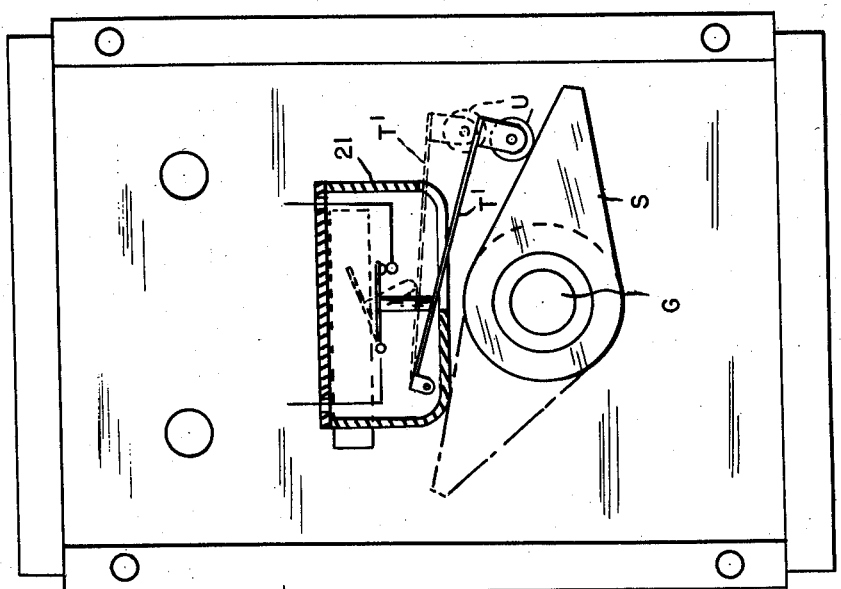
Fig. 4 is a sectional end elevation of Fig. 2.
Figure 2:
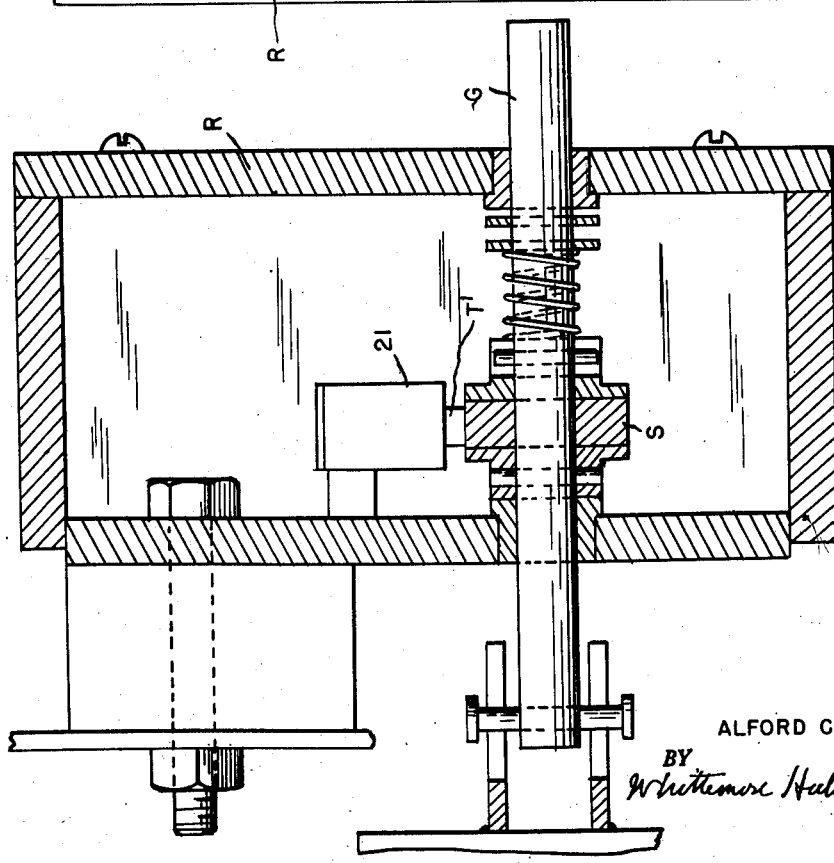
Fig. 2 is a sectional elevation of the control means mechanically actuated by the power transmission.

Fig. 1 illustrates a portion of the mechanism for operating a baling press in which A is a reversible electric motor. B is a power transmission mechanism from the motor to the main shaft C of the press which, through the medium of sprockets D and chains E, operates the platen F of the press. The compression chamber and the stationary platen therein are not illustrated as these may be of any suitable construction. Connected to the power transmission and preferably to the shaft C is a small diameter extension shaft G which operates a switch included in the starting circuit as will be hereinafter described. The motor A is of the multi-phase type and as illustrated is three phase. This is energized by current in the supply conductors H, I and J. A switch K couples these conductors with the motor for the forward driving of the same and a switch L effects the coupling for reverse driving. Each of these switches is electromagnetically operated, respectively, by the relays M and N. Push button switches O and O' are used respectively for energizing the relays M and N to operate the switches K and L. A third push button switch $O^2$, normally closed, is used to deenergize the relays M and N when the motor is to be stopped. The control circuits including a conductor 10 between the supply conductor H and one of the contacts of the push button switch $O^2$. A conductor 11 having branches $11^a$ and $11^b$ leading respectively to the relays M and N. A conductor 12 leading from the relay M to one contact of the push button switch O. A conductor 13 leading from the relay N to one contact of the push button switch O' and a conductor 14 interconnecting the second contacts of the push button switches O, O', $O^2$. There are also normally open switches 15 and 16 which are respectively closed by the operation of the relays M and N. A conductor 17 connects one contact of each of these switches with the conductor 14. The second contact of the switch 15 is connected by conductor 18 with conductor 12, and the second contact of switch 16 is connected by conductor 19 with conductor 13. Thus the relay M will be first energized by closing of the switch O but is maintained independent of such switch by the closing of shunt circuit including switch 15 and conductors 17 and 18. In like manner operation of the switch O' first energizes the relay N but its circuit is maintained by closing of the shunt including the switch 16 and conductors 17 and 19. The circuits for both relays M and N include the normally closed switch $O^2$, so that the operation of such switch will open either circuit.

Safety devices which have heretofore been employed are limit switches P, P' in the conductors 11$^a$ and 11$^b$ and an overload switch Q. The latter has an energizing coil 20 included in a conductor 20$^a$ which is between the lead H and the motor A. The switch, however, which is normally closed is included in the conductor 17 so that when open it will deenergize the relay M and open the main switch K. Thus any time that the current volume through the motor exceeds a safe limit, the overload switch Q will be operated to deenergize the relay M permitting the switch K to open. It is to be understood that switches K and L will automatically open when the relays M and N are deenergized.

Figure 3:
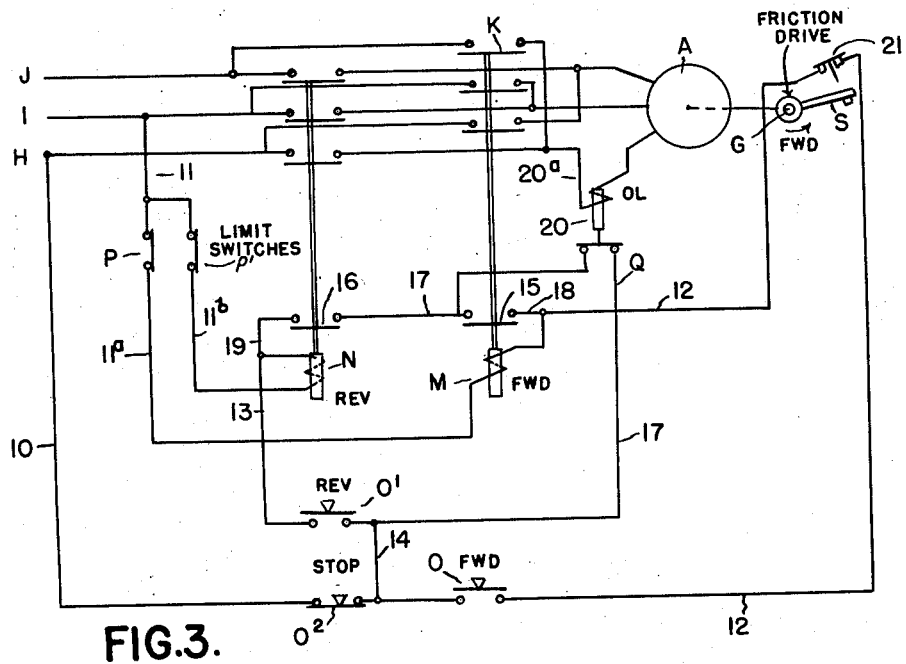
Fig. 3 is a diagram of the electric circuits for controlling the forward and reverse operations of the motor and for stopping the same.

As previously set forth, the defect of the control system thus far described is that when the switch K is automatically opened by the operation of the overload switch K, there is nothing to prevent the operator from again operating the push button switch O to again close the switch K. While this may again operate the overload switch the time interval required for such operation may be sufficient to pass an excessive volume of current through the motor to possibly cause the burning out of the same. I have, therefore, devised a further control which prevents the closing of the switch K by a second operation of the push button switch O if not preceded by the operation of the switch O' to effect a reverse operation of the motor. This control includes a normally closed switch 21 which is cut into the conductor 12 and which is located in proximity to the shaft G previously described. Preferably the switch 21 is housed within a casing R through which the shaft G passes. Mounted on the shaft G is a rock arm S which is driven through the medium of a friction clutch T. When the motor A is started by the operation of the push button switch to drive the transmission in a forward direction, or in the direction in which the sprockets D and chains E will elevate the compressor platen F. The rock arm S will be turned in a counterclockwise direction as shown in Fig. 3. After taking up a certain amount of lost motion, the arm S will contact with a rock arm T' which latter will open the switch 21 thereby breaking the circuit in the conductor 11. As the arm S is frictionally driven, movement will be arrested by a stop U after the rock arm T' has been actuated to open the switch. The arm S will remain in this position as long as the shafts C and G are rotating in the same forward direction. If, however, the motor is stopped and is then started in the reverse direction by the operation of the push button switch Q', movement will be imparted to the rock arm S in a clockwise direction which will withdraw it from the rock arm T' and permit the switch 21 to close. Thus after the motor has been started by the operation of the push button O, there will be a brief time interval before the rock arm S opens the switch 21 and this will be sufficient to insure the continued operation of the motor A. Such interval is necessary for when the switch K is first closed, there will be a rush of current through the motor circuit which may open the overload switch Q but soon the resistance built up in the motor will cut down on the current volume and the switch Q will close. The operator will, therefore, hold the switch O closed long enough to effect this building up of motor resistance. In the meantime a movement of the arm S will have taken up all lost motion between the same and the rock arm T' so that the latter will be actuated to open the switch 21. When once opened the switch 21 will remain open, being held in this position by the arm S, until the shaft G is turned in the reverse direction to withdraw the arm S from the arm T'.

From the above it will be understood that it is impossible for an operator to re-start the motor A in a forward direction until it has first been operated in the reverse direction.

What I claim as my invention is:

1. A rotary power transmission, an electric motor for driving said transmission alternatively in opposite directions, an electric starting circuit adapted when closed to energize said motor to drive said transmission in the first-mentioned direction of rotation, a switch in said circuit, means operated by the rotation of said transmission in the said direction for opening said switch and maintaining the same and said starting circuit open, and means operated by said transmission when rotated in the opposite direction for closing said switch.

2. A rotary power transmission, an electric motor for driving said transmission alternatively in opposite directions, a mechanism actuated by said transmission under progressively increasing load when driven in one direction and with relief of said load when driven in the opposite direction, an electric starting circuit adapted when closed to energize said motor to drive said transmission in the first-mentioned direction of rotation, a switch in said circuit, means operated by the rotation of said transmission in the said direction for opening said switch and maintaining the same and said starting circuit open, and means operated by said transmission when rotated in the opposite direction for closing said switch.

3. A rotary power transmission, a reversible electric motor for driving said transmission alternatively in opposite directions, a mechanism actuated by said transmission under progressively increasing load when driven in one direction and with relief of said load when driven in the opposite direction, separate means for energizing said motor in each of said directions, an electric starting circuit adapted when closed to energize said motor for rotation in the first-mentioned direction, a normally closed switch in said starting circuit, means operated by the rotation of said transmission in the said direction for opening said switch and holding the same open thereby rendering said starting circuit inoperative for the restarting of said motor if stalled, and means operated by said transmission when rotated in the opposite direction for closing said switch and restoring said starting circuit to operative condition.

4. A rotary power transmission, a reversible electric motor for driving said transmission alternatively in opposite directions, a mechanism actuated by said transmission under progressively increasing load when driven in the one direction, and with relief of load when driven in the opposite direction, circuit closing means for energizing said electric motor, electromagnetic means for operating said circuit closing means, an electric starting circuit for energizing said electromagnetic means, a normally open switch for closing said circuit, a normally closed switch in said circuit, means operated by said transmission when rotating in the first-mentioned direction for opening the last-mentioned switch and maintaining it open, and means operated by said transmission when rotated in the opposite direction for closing said last-mentioned switch to render said starting circuit operative upon the closing of said first-mentioned switch.

5. A rotary power transmission, a reversible electric motor for driving said transmission alternatively in opposite directions, a mechanism actuated by said transmission under progressively increasing load when driven in one direction and with relief of load when driven in the opposite direction, separate circuit closing means for energizing said motor for each of said directions of rotation, electromagnetic means for operating each of said circuit closing means, separate starting circuits for respectively energizing said electromagnetic means, a normally open switch for each starting circuit, a normally closed switch in one of said starting circuits, means operated by said transmission when rotating in the direction caused by the closing of the last-mentioned starting circuit for opening said normally closed switch and maintaining it open, and means operated by said transmission when rotating in the opposite direction for closing the last-mentioned switch.

ALFORD C. BARROWS.

REFERENCES CITED

The following references are of record in the file of this patent:

UNITED STATES PATENTS

| Number | Name | Date |
| --- | --- | --- |
| 1,698,325 | Thomas et al. | Jan. 8, 1929 |
| 2,264,993 | McShane | Dec. 2, 1941 |
| 2,287,788 | Diekhoff | June 30, 1942 |